UNITED STATES PATENT OFFICE.

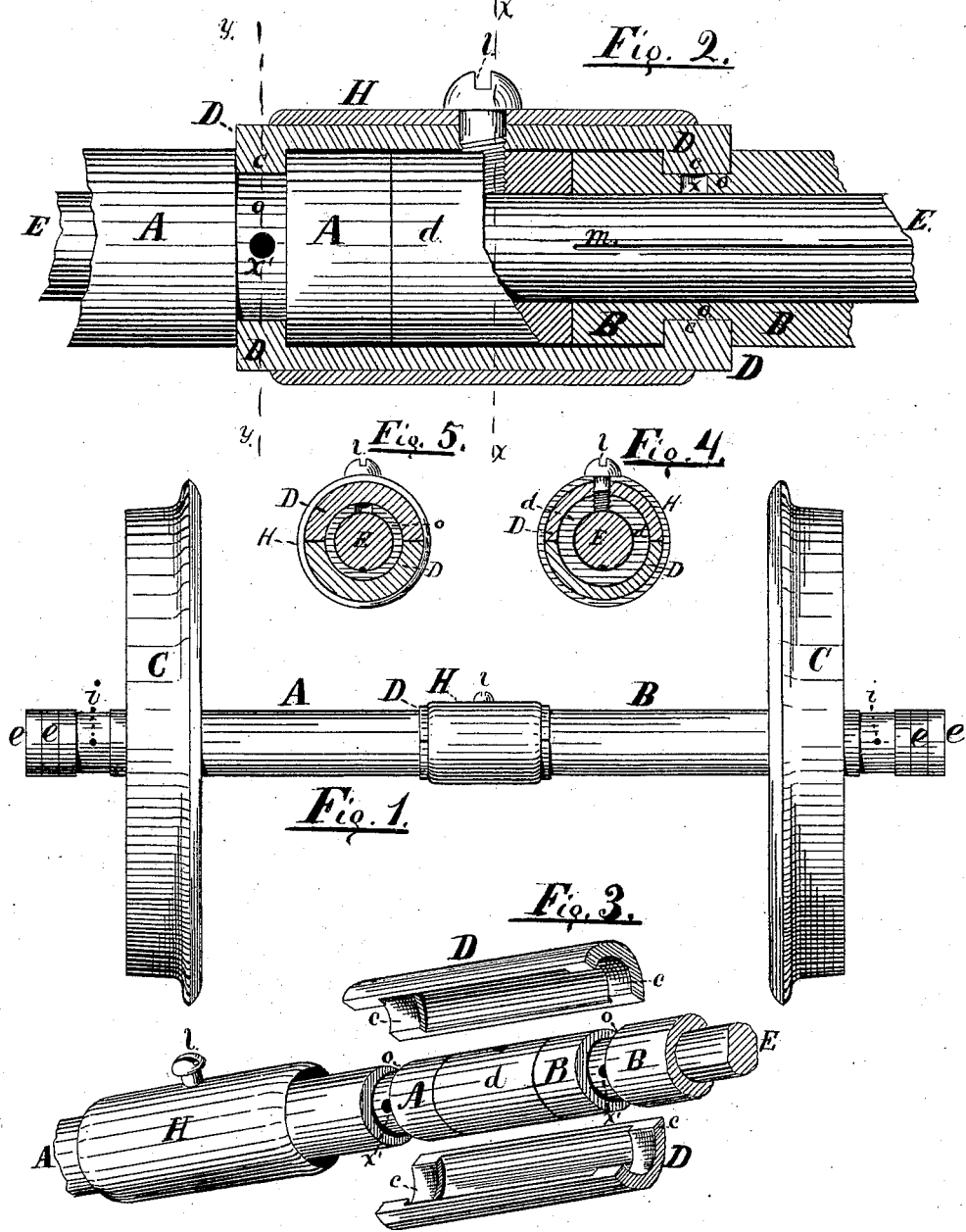

WILLIAM H. MURPHY, OF SYRACUSE, NEW YORK.

IMPROVEMENT IN CAR-AXLES.

Specification forming part of Letters Patent No. 210,623, dated December 10, 1878; application filed August 23, 1878.

*To all whom it may concern:*

Be it known that I, WILLIAM H. MURPHY, of the city of Syracuse, in the county of Onondaga and State of New York, have invented a new and Improved Car-Axle; and I do hereby declare that the following is a full, clear, and exact description of the same, reference being had to the annexed drawings, in which—

Figure 1 represents a view of the axle complete; Fig. 2, a view of the coupling with part of it broken out, showing also in section the manner in which the parts fit together around the collar on the axle and are fastened to it; Fig. 3, a perspective view of parts, the outer sleeve-collar tube, H, being pushed to one side, and the semicircular connections set off away from their places. Fig. 4 is a section on the line $x\ x$. Fig. 5 is a section on the line $y\ y$.

Like letters of reference represent corresponding parts wherever they occur.

This invention relates to and is an improvement upon the car-axle for which Letters Patent No. 206,599, dated July 30, 1878, have been granted to me.

It consists of an improved coupling to hold the inner ends of the sleeves in proper position and prevent their endwise motion upon the solid axle running through them, even if the nuts or fastenings at the ends of the axle are removed or lost off, while the sleeves are left free to revolve upon the axle together or independent of each other.

A B are the metallic sleeves, around which, near the inner ends, the shouldered bearings $o\ o$ are cut of any desired depth. C C are the wheels mounted upon the sleeves. E is the solid axle-piece, upon which, at or near the center, a plain collar, $d$, is mounted and securely fastened, or it may be a part of the axle itself. $x'\ x'$ are oil-holes in the shouldered bearings $o\ o$ upon the sleeves A B, extending through and communicating with the oil-groove $m$ upon the solid axle. D D are the semi-cylindrical connections, constructed of substantially the shape shown in the drawings, and having upon their inner peripheries, at the ends, or near them, the shouldered bearing-surfaces $c\ c$, which fit into or upon the shouldered bearings $o\ o$ upon the sleeves.

These connections, when in place, completely inclose and cover the collar $d$ and the inner ends of the sleeves A B. If desired, a lip may be added to them, extending a short distance over the sleeves beyond the bearings $o\ o$ toward the wheels. The inner ends of the sleeves can be cut down to the same size as the collar $d$, if desired, so that the connections will fit against them and the collar.

H is a loose tube, which is made to fit closely over the connections D D when in position and hold them there. This tube can be split lengthwise on one side, if desired, and a tightener of any suitable form put on around it to take up the wear of the bearings.

The sleeves A B, with the tube H thereon, being placed upon the axle E and fastened up closely against the collar $d$ by the double right and left hand nuts $e\ e$, the connections D D are placed in position with the shouldered bearing-surfaces $c\ c$ fitting into the corresponding bearings $o\ o$, and the tube H is slid along over them. The screw $l$ is then put in through the tube and one of the connections D, and into the solid collar $d$, thereby fastening the tube and connections securely to the collar, preventing them from turning with the revolutions of the sleeves, holding the tube H securely, and coupling the inner ends of the sleeves loosely, yet in such a manner as to prevent any endwise movement of the sleeves upon the axle-shaft, even if the nuts $e\ e$ are entirely removed.

By the revolution of the sleeves upon the axle the oil or lubricator is fed into the groove $m$ in the axle E, as described in my former patent, and upon reaching the oil-holes $x'\ x'$ in the shouldered bearings $o\ o$ will feed through them and lubricate these bearings.

The lubricant is supplied through the apertures $i\ i$ in the outer shouldered bearings, as in my said patent; but in order to lubricate the wheel-sleeves, the solid axle, and the shouldered coupling, the apertures $x'\ x'$ are provided at the ends of the shouldered bearings of said sleeves to effect the communication between the axle-groove and the shouldered bearings of the sleeves and of the coupling.

A divided axle with shouldered bearings at the inner abutting ends and a segmental coupling-sleeve having end shouldered bearings coinciding and interlocking with those of the axle, and used in connection with an inclosing-sleeve abutting against the wheel-hubs for securing the divided axle and allowing of the independent movement of the wheels, is not claimed, broadly, in this patent, as it is old and public property, and as to my said patent the improvements herein are specifically pointed out and embraced in the claims.

I claim—

1. In a car-axle having independent sleeves A and B turning with the wheels, the semi-cylindrical shouldered couplings D D, adapted to lock said sleeves against a meeting shoulder of the axle E, and confined in their coupling position by a sleeve, H, substantially as and for the purpose herein set forth.

2. In a car-axle, the combination, with the wheel-sleeves A and B, having the shouldered end bearings $o\ o$, of the solid axle E, having the shoulder $d$, and the semi-cylindrical couplings A B, having end bearing-shoulders $c\ c$, and their confining-sleeve H, adapted for use substantially as herein set forth.

3. The shouldered axle E $d$, the wheel-sleeves A and B, having the end shouldered bearings $o\ o$, the semi-cylindrical couplings D D, having coincident shouldered bearings $c\ c$, the confining-sleeve H for said couplings D D, and the screw $l$, passing through said confining-sleeve, one of said couplings D, and into the axle-shoulder, whereby the said semi-cylindrical couplings and their confining-sleeve are secured to the solid axle.

4. The wheel-sleeves A and B, provided with apertures $x'\ x'$ on their inner shouldered bearings, $o\ o$, and the apertures $i\ i$ in their outer end shouldered bearings, in combination with the groove $m$ in the solid axle E and the semi-cylindrical coupling D, whereby the sleeves, the coupling, and the solid axle are lubricated, and the lubricant confined within said parts.

W. H. MURPHY.

Witnesses:
C. W. SMITH,
H. BAXTER.